United States Patent
Butler et al.

(10) Patent No.: US 10,109,110 B2
(45) Date of Patent: Oct. 23, 2018

(54) REALITY AUGMENTATION TO ELIMINATE, OR DE-EMPHASIZE, SELECTED PORTIONS OF BASE IMAGE

(71) Applicant: International Business Machines Corporation, Armonk, NY (US)

(72) Inventors: Christopher J. Butler, Hawthorn East (AU); Rahil Garnavi, Macleod (AU); Timothy M. Lynar, Kew (AU)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 14/753,041

(22) Filed: Jun. 29, 2015

(65) Prior Publication Data
US 2016/0379412 A1 Dec. 29, 2016

(51) Int. Cl.
G06T 19/20 (2011.01)
G06T 19/00 (2011.01)
G02B 27/01 (2006.01)

(52) U.S. Cl.
CPC ............ *G06T 19/006* (2013.01); *G02B 27/01* (2013.01); *G02B 27/017* (2013.01); *G02B 2027/014* (2013.01); *G02B 2027/0118* (2013.01); *G02B 2027/0178* (2013.01); *G06T 19/20* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 5,406,415 A | 4/1995 | Kelly | |
| 6,559,813 B1 | 5/2003 | DeLuca et al. | |
| 8,427,395 B2 | 4/2013 | Seder et al. | |
| 8,910,201 B1 * | 12/2014 | Zamiska | H04N 21/44222 725/34 |
| 9,576,398 B1 * | 2/2017 | Zehner | G06T 19/006 |
| 2006/0277474 A1 | 12/2006 | Robarts et al. | |
| 2009/0231867 A1 * | 9/2009 | Mochizuki | B60Q 1/143 362/466 |
| 2010/0014711 A1 * | 1/2010 | Camhi | B60K 28/06 382/104 |
| 2010/0103075 A1 | 4/2010 | Kalaboukis et al. | |
| 2010/0149073 A1 | 6/2010 | Chaum et al. | |

(Continued)

OTHER PUBLICATIONS

Bulan, Jamy, "Safety with Style: Tips for Choosing the Right Auto-Darkening Welding Helmet", provided by inventor in Main Idea of Disclosure dated Apr. 3, 2013, 6 pages, <http://www.lincolnelectric.com/en-us/support/welding-how-to/pages/auto-darkening-helmet.aspx>.

(Continued)

*Primary Examiner* — Mark Zimmerman
*Assistant Examiner* — Yu-Jang Tswei
(74) *Attorney, Agent, or Firm* — David B. Woycechowsky (57) ABSTRACT

An augmented reality display system used to diminish (for example, obscure, obfuscate, hide, make less distracting, block out, "white wash" and/or make less discernible) certain portions of a base image (for example, a user's view of a part of the real world as seen through eyeglasses). Some examples of visual subject matter that can be diminished include: (i) driver distraction phenomena; (ii) advertising; and/or (iii) subject matter the user is not authorized to view.

12 Claims, 4 Drawing Sheets

(56) References Cited

U.S. PATENT DOCUMENTS

| | | | |
|---|---|---|---|
| 2010/0205667 A1* | 8/2010 | Anderson | G06F 3/013 |
| | | | 726/19 |
| 2011/0221668 A1 | 9/2011 | Haddick et al. | |
| 2012/0115513 A1* | 5/2012 | Han | G06T 19/006 |
| | | | 455/456.3 |
| 2012/0182206 A1 | 7/2012 | Cok et al. | |
| 2012/0242560 A1 | 9/2012 | Nakada et al. | |
| 2012/0330646 A1 | 12/2012 | Andrade et al. | |
| 2013/0229712 A1 | 9/2013 | Kress | |
| 2013/0257691 A1 | 10/2013 | Saito | |
| 2014/0347265 A1 | 11/2014 | Aimone et al. | |
| 2016/0242035 A1* | 8/2016 | Chaillan | H04W 12/08 |

OTHER PUBLICATIONS

Cosco et al., "Augmented Touch without Visual Obtrusion", 8th IEEE International Symposium on Mixed and Augmented Reality, (ISMAR 2009), Oct. 19-22, 2009, pp. 99-102, Orlando, FL, doi: 10.1109/ISMAR.2009.5336492.

Doolin et al., "Augmented government Transforming government services through augmented reality", A GovLab Study, Copyright 2013 Deloitte Development LLC, pp. 1-35.

Horn, Leslie, "Here's How Google Glass Actually Works", GIZMODO, Filed to: Google glass Apr. 9, 2013 9:19am, 17 pages, <http://gizmodo.com/5994132/heres-how-google-glass-actually-works>.

Livingston et al., "Resolving Multiple Occluded Layers in Augmented Reality", Proc. of Intl. Symposium on Mixed and Augmented Reality (Tokyo, Japan), Oct. 7-10, 2003, Proceedings of the Second IEEE and ACM International Symposium on Mixed and Augmented Reality (ISMAR '03), 10 pages.

Tonnis et al., "Experimental Evaluation of an Augmented Reality Visualization for Directing a Car Driver's Attention", Proceedings of the International Symposium on Mixed and Augmented Reality (ISMAR'05), 0-7695-2459-1/05, 4 pages.

"Active shutter 3D system", Wikipedia, the free encyclopedia, page last modified on Nov. 1, 2014 at 15:58, 10 pages.

"Single and Variable Shade Auto-Darkening Filters", User Instruction Manual, Arc One, pp. 1-15, provided by inventor in Main Idea of Disclosure dated Apr. 3, 2013.

\* cited by examiner

REALITY AUGMENTATION TO ELIMINATE, OR DE-EMPHASIZE, SELECTED PORTIONS OF BASE IMAGE

BACKGROUND

The present invention relates generally to the field of augmented reality displays, and more particularly to both: (i) direct augmented reality displays where some of what a user's eye sees is light received directly from a target object (for example, an augmented reality windshield of a motor vehicle), and (ii) indirect augmented reality displays where the entire display is based on video signals, rather than direct viewing (for example, an augmented reality view based largely on a feed from a remote security camera).

Personal Heads Up Display (HUD) devices are augmented reality display devices made for vehicles. The augmentation of the view through the vehicle windows means that the driver can keep her head up more (for example, not look down at the dashboard, thereby taking her eyes off the road, to check the fuel gauge). Currently, most HUD systems are designed to augment the information available to the user. HUDs and/or helmet mounted displays have been used in military aviation to augment the perception of a user. One goal here is to allow critical information to be displayed to a user while they are focusing on in the far-field, as opposed to at the screen itself. This is typically achieved by using a projector combined with a reflective prism or glass surface allowing the projected image to be combined with the incoming light from the far field. This approach typically does not significantly compromise the native vision of the user.

Another known technology for altering the visual appearance of the far-field is to use active and passive polarizing materials such as LCD (liquid crystal display) lenses. LCD lenses are used in active 3D projection or other technologies such as welding helmets. In both of these cases, the technology regulates the light transmitted to each of the eyes, where the smallest regulating unit is one lens (that is, substantially the entire light arriving at the eye).

One additional piece of augmented reality display terminology will now be introduced. As used herein, a "base image" is a real, or virtual view that corresponds to what a viewer would see if an augmented reality display were not augmented. In a "real" base image, this view consists primarily of objects (for example, a horizon, a tree) that actually exist in the real world. In a "virtual" base image, the view would consist primarily of objects that are made to look (at least to some degree) like they exist in the real world. This "base image" is distinguished from the "augmentation portion" of the augmented reality display, which augmented portion changes what is shown in the base image to convert the base image into an augmented reality image. Both direct augmented reality images and indirect augmented reality images will generally include both a base image and augmentation portion.

SUMMARY

According to an aspect of the present invention, there is a method, computer program product and/or system that performs the following operations (not necessarily in the following order): (i) detecting the presence and location of a visual distraction in a raw video data set corresponding to a user's field of view; generating a set of diminishment data to diminish the visual distraction; and augmenting a display, which can be seen on and/or through augmented real world display hardware, based on the set of diminishment data to generate an augmented reality display where the visual distraction is diminished by the augmentation.

DETAILED DESCRIPTION

Some embodiments of the present invention are directed toward generating augmented reality displays where the augmentation portion "diminishes" (see definition of "diminish," below, in the Definitions sub-section of this Detailed Description section) a portion of the base image (also sometimes herein referred to as "raw video signal" or "raw video") according to one of the following criteria: (i) to hide, or partially hide, visual information that the viewer is not authorized to view; (ii) to hide, or help hide, "driver distraction phenomena" (see definition of "driver distraction phenomena," below, in the Definitions sub-section of this Detailed Description section); and/or (iii) advertising.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
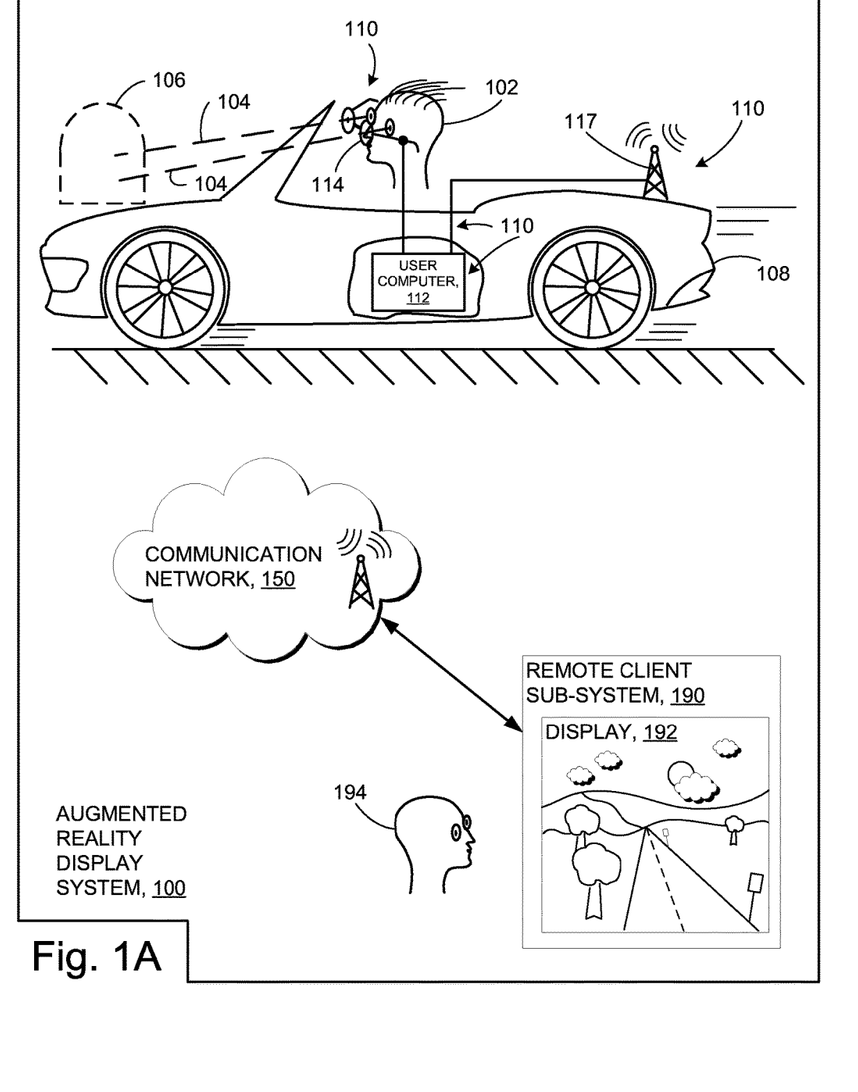
FIG. 1A is a block diagram of a first embodiment of an augmented reality display system according to the present invention.
Figure 1B:
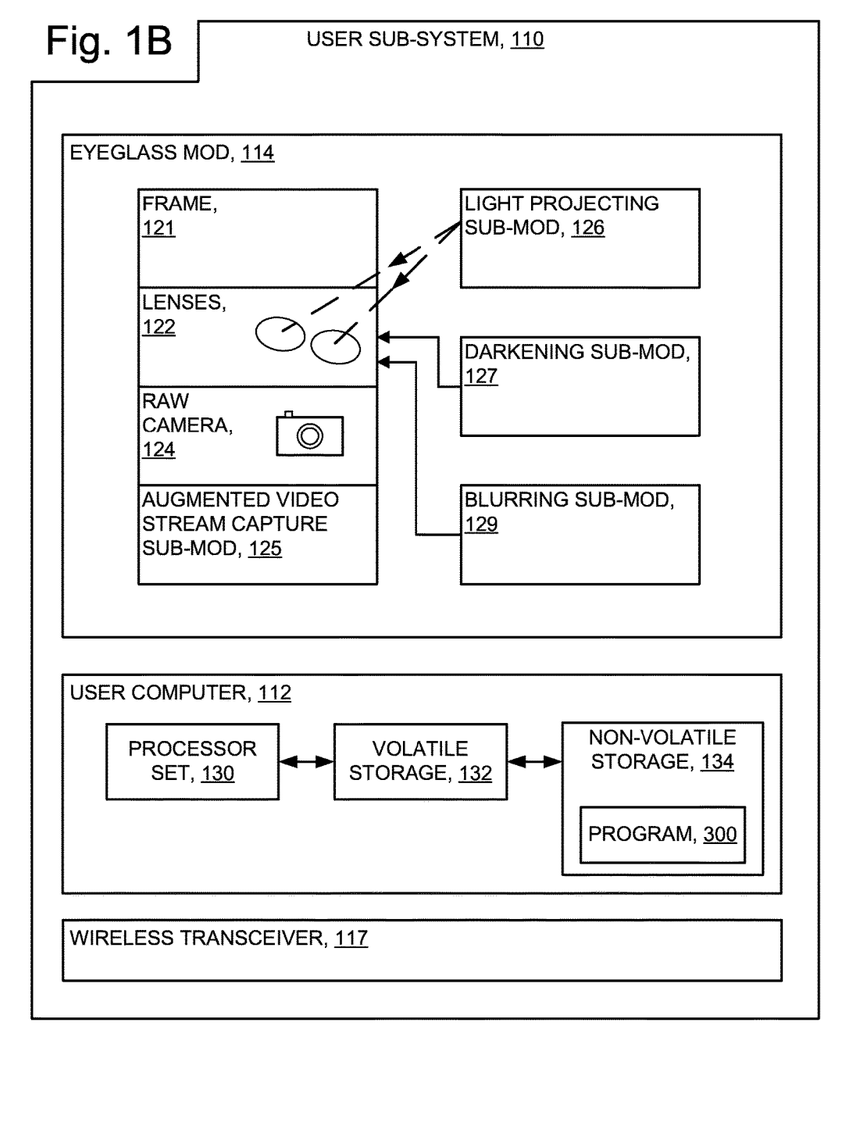
FIG. 1B is a block diagram of a portion of the first embodiment system.

An embodiment of possible hardware and software environment for software and/or methods according to the present invention will now be described in detail with reference to the Figures. FIGS. 1A and 1B collectively make up a functional block diagram showing augmented reality display system (or, more simply, an augmented display system) 100, including: user 102; light received directly from the real world 104; raw video display subject matter 106; vehicle 108; user sub-system 110; communication network 150; remote client sub-system 190 (including display 192); and user 194. User sub-system 110 includes: eyeglasses module ("mod") 114 (including frame 121, lenses 122, raw camera 124 augmented video stream capture sub-mod 125, light projecting sub-mod 126, darkening sub-mod 127 and blurring sub-mod 129); user computer 112 (including processor set 130, volatile storage 132, non-volatile storage 134 and program 300); and vehicle-mounted wireless transceiver 117.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
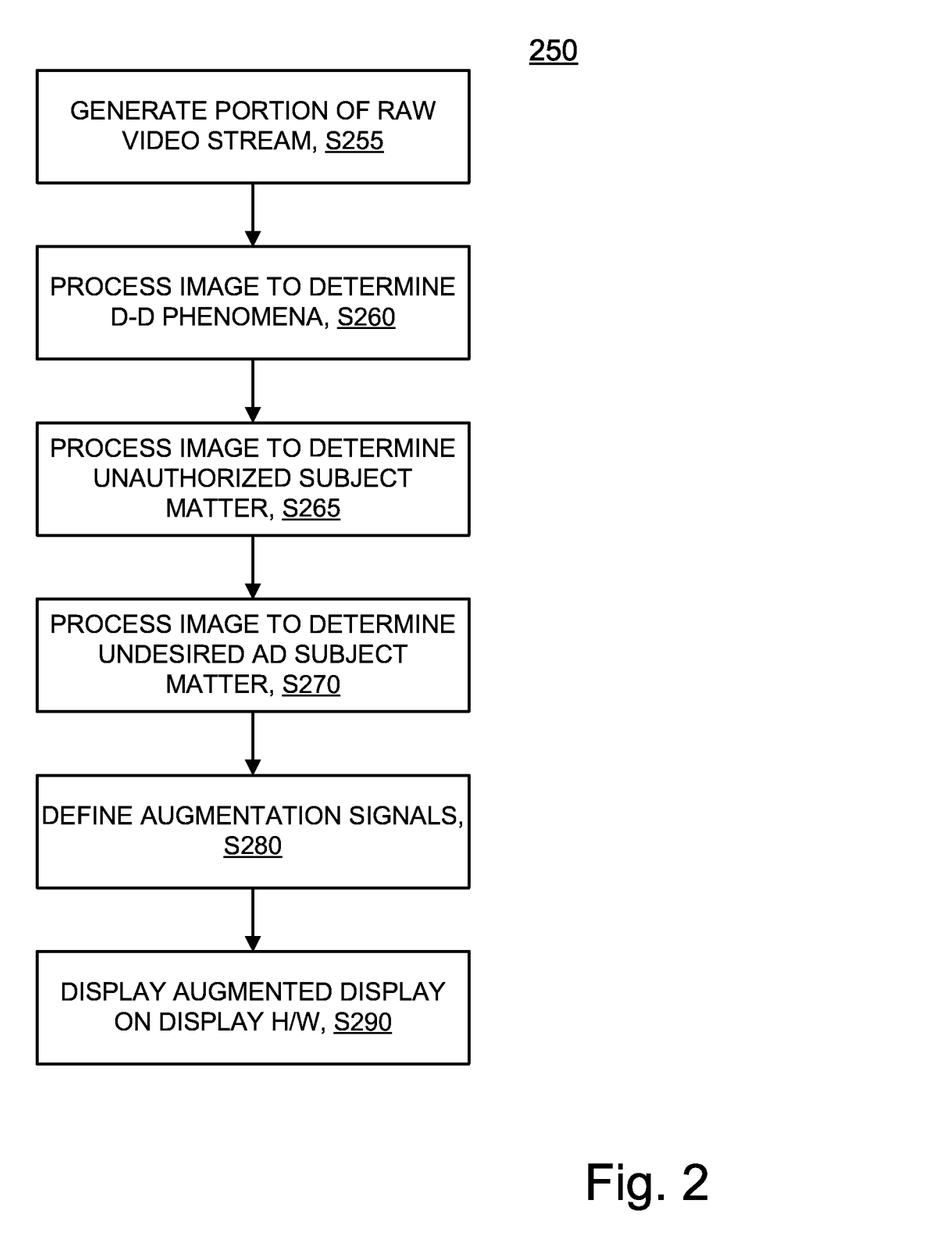
FIG. 2 is a flowchart showing a first embodiment method performed, at least in part, by the first embodiment system.
Figure 3:
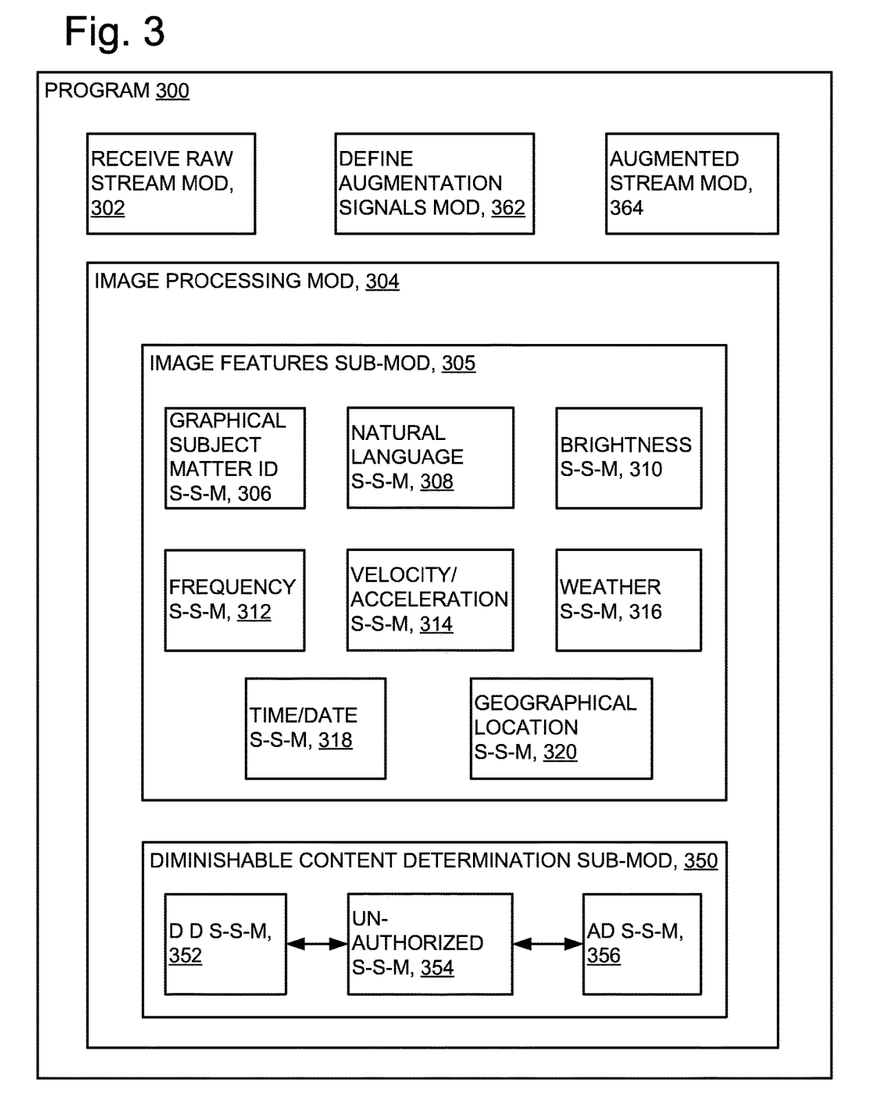
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where raw camera 124 generates a raw video stream. Camera 124 is positioned and oriented so that the raw video steam is substantially the same as the field of view of first user 102 who is wearing frame 121 and lenses 122 of eyeglasses mod 114 (see FIGS. 1A and 1B). In this example, raw camera 124 is built into frame 121 of eyeglasses mod 114. These eyeglasses are an embodiment of a direct augmented reality display where some of what a user's eye(s) see is light received directly from a target object.

Processing proceeds to operation S260, where: (i) the raw video stream is sent to receive raw stream mod 302 of program 300 of user computer 112 of user sub-system 110 (see FIGS. 1A and 1B); and (ii) driver distraction sub-sub-mod 352 of diminishable content determination sub-mod 350 of image processing mod 304 of program 300 performs image processing to determine whether any "driver distraction phenomena" (see definition, below in Definitions sub-section of this Detailed Description section) are present in the raw video stream.

More specifically, in this embodiment, driver distraction sub-sub-mod 352 uses image features sub-mod 305 to analyze the images of the raw data stream to determine any driver distraction phenomenon that may be present in the raw video stream. This analysis and determination is made automatically, in real time, with very low latency and by machine logic. Even more specifically, the machine logic of image features sub-mod 305 includes, in relevant part: brightness sub-sub-mod 310; frequency sub-sub-mod 312; velocity/acceleration sub-sub-mod 314; weather sub-sub-mod 316; time and date sub-sub-mod 318; and geographical location sub-sub-mod 320. Some example operations of sub-sub-mods 310, 312, 314, 316, 318 and 320, in co-operation with machine logic based rules of driver distraction sub-sub-mod 352, will be respectively discussed in the following paragraphs.

BRIGHTNESS SUB-SUB-MOD 310: determines bright spots in the raw video. All bright spots are potentially driver distraction phenomena, especially if they are bright enough to effectively blind a driver. Even less bright spots may be considered as a driver distraction phenomena is the bright spot is the result of something that is not worthy of undue attention from the driver. Accordingly, driver distraction sub-sub-mod 352 applies machine logic rules to the bright spots detected by brightness sub-sub-mod 310 to determine: (i) whether the bright spot is indeed a driver distraction phenomenon that should be diminished by image augmentation; (ii) the degree of appropriate diminishment of the bright spot; and (iii) the best type of augmentation to use to diminish the bright spot (various different types of image augmentation will be discussed below). As one simple example, if brightness sub-sub-mod determines that the entire display is very bright, then this triggers application of a rule in driver distraction sub-sub-mod that darkens the entire augmented display.

FREQUENCY SUB-SUB-MOD 312: determines the frequency of periodic features in the raw video stream because this can help driver distraction sub-sub-mod 352 whether the feature is a driver distraction phenomenon. In this embodiment, another rule of driver distraction mod 352 specifies that if a flashing bright spot flashes at a frequency greater than a threshold frequency, then some of the flashes of the bright spot will be darkened so that the bright spot appears to the driver to be flashing at a lower frequency. As an example, if another vehicle on the road has its emergency flashing lights set at such a high frequency that they can induce an epileptic episode in the driver, then two out of every three flashes may be darkened so that the frequency of the flash is reduced by two thirds. The driver will see the flashing light on the other vehicle in the augmented display, but it will now be flashing at a safe frequency as viewed in the augmented display. Note that application of this rule of driver distraction sub-sub-mod requires input from both brightness sub-sub-mod 310 and frequency sub-sub-mod 312. Some embodiments of the present invention may apply relatively sophisticated analysis in the sense that many visual features of the image are co-operatively analyzed to determine driver distraction and/or other types of diminishable content.

VELOCITY/ACCELEARTION MOD 314: determines the velocity and acceleration of objects shown in the video image. For example, in this embodiment, one of the rules of driver distraction sub-sub-mod 352 specifies that if another vehicle is moving away from the driver at a high rate of speed and/or acceleration, then the portion of the augmented image showing that speeding-away vehicle should be somewhat diminished as a driver distraction from closer traffic moving at a speed and/or acceleration closer to that of the subject driver's vehicle.

WEATHER SUB-SUB-MOD 316: determines the weather where the driver is driving. For example, in this embodiment, one of the rules of driver distraction sub-sub-mod 352 specifies that if the driver is driving in dense fog then there should be no driver distraction based diminishment (that is, the other driver distraction diminishment rules of sub-sub-mod 352 are suspended), because the dense fog can cause unexpected and undesired triggering of various driver distraction diminishment rules. In this embodiment, weather sub-sub-mod detects fog and other weather phenomena using information from both: (i) the raw image itself (an "intrinsic source"); and (ii) data collected from a weather website accessible over the internet (an "extrinsic source"). More generally, the various sub-sub-mods of image features sub-mod 305 may use information from intrinsic and/or extrinsic sources.

TIME/DATE SUB-SUB-MOD 318: determines the current local time and date. In this embodiment, some rules of driver distraction sub-sub-mod are only applicable at night. Accordingly, time/date sub-sub-mod 318 provides the information needed so that driver distraction sub-sub-mod 352 can determine whether the nighttime rules are applicable.

GEOGRAPHICAL LOCATION SUB-SUB-MOD 320: determines the geographic location and orientation of the raw video image. In this embodiment, driver distraction sub-sub-mod 352 includes rules for darkening the rising or setting sun. Geographical location sub-sub-mod 320, and time/date sub-sub-mod 318, provide information that can help driver distraction sub-sub-mod 352 apply machine logic based rules to determine whether a bright spot (determined by brightness sub-sub-mod 310) is the rising/setting sun, or something else.

Processing proceeds to operation S265, where unauthorized sub-sub-mod 354 of diminishable content determination sub-mod 350 of image processing mod 304 of program 300 performs image processing to determine whether any "unauthorized content" (see definition, below in Definitions sub-section of this Detailed Description section) is present in the raw video stream.

More specifically, in this embodiment, unauthorized sub-sub-mod 354 uses image features sub-mod 305 to analyze the images of the raw data stream to determine any unauthorized content that may be present in the raw video stream. This analysis and determination is made automatically, in real time, with very low latency and by machine logic. Even more specifically, the machine logic of image features sub-mod 305 includes, in relevant part: graphical subject matter identification (ID) sub-sub-mod 306; and natural language sub-sub-mod 308. Some example operations of sub-sub-mods 306 and 308, in co-operation with machine logic based rules of unauthorized content sub-sub-mod 354, will be respectively discussed in the following paragraphs.

GRAPHICAL SUBJECT MATTER SUB-SUB-MOD 306: determines potentially offensive and/or disturbing content in the raw video image so that the graphic content can be diminished, for example, by blurring it. In this embodiment, unauthorized content sub-sub-mod 354 includes a rule that dead animals in the roadway (as determined by graphical subject matter ID sub-sub-mod 306) should be blurred to avoid causing undue emotional upset to a viewer.

NATURAL LANGUAGE SUB-SUB-MOD 308: determines and parses natural language in the raw video stream. In this embodiment, unauthorized content sub-sub-mod 354 includes a rules providing for the diminishment of confidential information. This is further discussed, below, in the Further Comments And/Or Embodiments Sub-Section of this Detailed Description section. The determination and parsing of natural language can help determine whether a viewer is attempting to review confidential information that the viewer is not authorized to view.

Processing proceeds to operation S270, where advertisement sub-sub-mod 356 of diminishable content determination sub-mod 350 of image processing mod 304 of program 300 performs image processing to determine whether any advertisement subject matter is present in the raw video stream. More specifically, in this embodiment, advertisement sub-sub-mod 356 uses input from natural language sub-sub-mod 308 to apply machine logic based rules to determine whether diminishable advertising content is present in the raw video stream.

As discussed above, this embodiment potentially provides diminishment in response to three types of visual distractions: (i) driver distraction; (ii) unauthorized content; and/or advertisement subject matter. It is noted that a single distracting portion in a raw video signal may be considered as a distraction for more than one of these three reasons (that is, the categories are not necessarily mutually exclusive). Other embodiments may provide for diminishment only for some sub-set of these three visual distraction types. Still other embodiments may, additionally or alternatively, provide augmented display diminishment for other visual distraction types (now known or to be identified in the future).

Processing proceeds to operation S280, where define augmentation signals mod 362 defines augmentation signals that are used to create augmented display(s) on augmented display hardware. These augmentation signals are a form of "diminishment data" because they augment a base display by diminishing (rather than emphasizing or adding meaningful data to) certain visual features in the base display. Generally speaking, this signal definition includes at least aspects: (i) determining what portions of the user's field of view (in a direct augmented video display) or the raw video (in an indirect augmented video display) are to be diminished; and (ii) determining the manner in which the diminishment is to be accomplished. If the data is being sent to an indirect augmented video display, definition of the augmentation signals will also use the raw video data to define the undiminished portions of the video display, and also potentially to help define diminished portions of the indirect augmented video display (for example, in cases where a distraction portion of the raw video image is to be diminished by blurring).

By the time of S280, the distraction portion(s) of the raw video data have already been determined by sub-sub-mods 352, 354 and 356, as discussed above. However, these portions may need to be mapped, by the machine logic of define augmentation signals mod 362, onto some co-ordinate system associated with the augmented display hardware.

By the time of S280, the distraction portion(s) of the manner in which the diminishment of the diminishment portion(s) is to be accomplished (for example, lightening, darkening, blurring) has already been determined by sub-sub-mods 352, 354 and 356, as discussed above. Define augmentation signals mod 362 defines signals to control the hardware and/or software that actually performs the diminishment, as will be further discussed, below, in connection with operation S290.

Processing proceeds to operation S290, where: (i) a direct augmented video display is created for user 102 through lenses 122 of eyeglasses mod 114 of user sub-system 110 (see FIGS. 1A and 1B); and (ii) an indirect augmented video display is created for user 194 on display hardware 192 of remote client sub-system 190 (see FIG. 1A). While this embodiment creates both a direct augmented video display and an indirect augmented video display, other embodiments may create just one of these types.

In this embodiment, augmented stream mod 364 sends the augmentation signals (or "diminishment data," defined at operation S280) to: light projecting sub-mod 126; darkening sub-mod 127; and blurring sub-mod 129. These sub-mods 126, 127 and 129 apply signals (for example, direct visible light, fiber optic signals, electrical signals) to and/or incident upon lenses 122 to diminish the distraction portion(s) of the image that can be seen by user 102 through the lenses by lightening, darkening and/or blurring. In this way, user 102 sees an augmented video image that includes: (i) visible light directly received from the real world; and (ii) visible light that has been added, or modified in its characteristics by eyeglasses 114 mod (eyeglasses mod 114 is a type of "goggle" hardware). In this embodiment, the augmentation is determined and performed by user sub-system 110 in the local vicinity of user 102 which can reduce delays and/or latencies. Alternatively, in other embodiments, the augmentation could be performed by a remote computer communicating through a wide area network.

In this embodiment, augmented video stream capture sub-mod 125 captures the direct augmented video display seen by user 102, and converts it into an augmented video stream signal. The captured augmented video display includes diminishment portions, and the portions of the captured display corresponding to these diminishment portions are another form of "diminishment data." This augmented video stream signal is wirelessly sent to communication network 150 and to display 192 of remote client sub-system 190. In response, an indirect augmented video display is displayed for user 194. Alternatively, define augmentation signals mod 362 and augmented stream mod 364 could define and send indirect augmented video display signals directly to remote client sub-system 190, instead of generating the indirect augmented video image in eyeglasses mod 114. As a further alternative, the indirect augmented video could be further augmented (for example, conventional image augmentation, to reduce distraction according to some embodiments of the present invention).

III. Further Comments and/or Embodiments

Some embodiments of the present invention may include one, or more, of the following characteristics, features and/or advantages: (i) a system and method to employ augmented reality technologies to selectively "diminish" the ability of the user to see certain features within the base image (for example, a far field portion of the base image); (ii) selective diminishment of "driver distraction phenomena," such as: (a) mobile phone flashing whilst driving in the driving context, (b) lights flashing besides or behind a driver, (c) directed light distractions (that is, sun light reflecting off a car window), (d) peripheral vision driver distractions, such as advertisements, and/or (e) the center of oncoming head lamps set on high beam; (iii) selective darkening of portions of the lens so as the protect the eyes from bright light sources, such as directed lights; (iv) restricting the ability of a user to see information that the user is not authorized to see (see definition of "unauthorized content," below, in the definitions sub-section of this Detailed Description section); and/or (v) an augmented reality display that automatically detects and alters visual reality in a minimally invasive fashion to eliminate detected visual distractions.

According to an embodiment of this disclosure, an augmented reality display system takes the form of a heads up display (HUD), similar to commercial devices in the form of eyeglasses including: (i) hardware and software for projecting an augmentation portion onto portions of the base display that the wearer can see directly through the lenses of the eyeglasses; (ii) a prism sub-system; (iii) an LCD shutter; and (iv) a video capture sub-system. In this embodiment, the augmented reality view covers the majority of a normal field of view for both eyes. The augmented reality display system includes an LCD shutter located on the external side of the prism sub-system, thereby not interfering with the prism sub-system. In this embodiment, the display sub-system includes: (i) a video capture sub-sub-system, connected and/or located to be oriented to a user's field of view; and (ii) a processing unit configured to: (a) analyze a video stream from the video capture sub-sub-system, and (b) augment the display with the augmented portion of the display visible to the user. This embodiment of an augmented reality display system is connected, in data communication (see definition, below), with outside systems to assist with processing.

In this embodiment, the augmented reality display system includes functionality typically associated with conventional HUD systems, such as the ability to provide extra information to the user via projection. Additionally, this embodiment has the ability to control what is visible from the external field of view by doing one, or more, of the following: (i) adding extra light to the base display ("brightening style augmentation"); (ii) removing light from the base display ("darkening style augmentation"); and/or (iii) blurring light from the base display ("blurring style augmentation"). In this embodiment, brightening style augmentation is achieved by transmitting extra light, via the HUD/prism projector, to the user to either enhance or obfuscate a portion of the base image. In this embodiment, darkening style augmentation is achieved by blocking/restricting the transmission of light from the base image to the user. These various styles of augmentation can be used to either enhance or restrict the user's view of the base image. In one application of this embodiment of an augmented reality display system, driver distractions are diminished by one, or more, of the various augmentation styles. In another application of this embodiment of an augmented reality display system, portions of a base image that a user is "not authorized" to view are diminished by one, or more, of the various augmentation styles.

This embodiment of an augmented reality display system performs the following workflow: (i) the user provides or makes available to the device contextualizing information to the system, such as location or activity information (for example, the system is made aware the user is driving a vehicle, working in a classified environment or seeking minimal distractions from a particular task); (ii) video is captured from the environment; (iii) video processing to classify the environment and objects within the environment; and (iv) the augmentation portion of the image visible to the user includes an augmentation portion that diminishes porta portion of the base image based on rules from the classification of objects and the environment (for example, selective diminishment of driver distraction phenomena and/or subject matter the user is not authorized to view).

In one example of augmentation by this embodiment of the augmented reality display system, brightening style augmentation is used for direct enhancement of the image via additional projected light (typical HUD operation). In another example of brightening style augmentation, projected light is used to diminish a portion of a base image by "white-washing" that portion of the base image such that relatively dark regions of the diminished portion are subject to the addition of extra light to give the diminished portion a flat color in order to: (i) make the diminished portion of the base image less distracting to the user; and/or (ii) hide the subject matter of the diminished portion from the user.

In an example of operation of this embodiment of the augmented reality display system where darkening style augmentation is used, polarizing lenses are used to darken a diminished portion of the image. This diminishment by selective polarization may be combined with the white-wash projection described in the previous paragraph to better achieve diminishment of the diminished portion of the base image.

Another embodiment of an augmented reality display system according to the present disclosure will now be discussed. In this embodiment: (i) context is provided to the system; (ii) video is captured from the environment; (iii) video is processed to classify the environment and objects within the environment; (iv) per determined "distractions" as below mentioned are detected and classified as such; and (v) detected distractions are diminished through one of or a combination of: (a) direct enhancement of the image via additional projected light (typical HUD operation), (b) using projected light to "white-wash" an image where dark regions of an object are enhanced with extra light to give a flat color, and/or (c) polarizing lenses are used to darken (sections) of the image thereby obscuring the image.

Another embodiment of an augmented reality display system according to the present disclosure will now be discussed. In this embodiment: (i) context is provided to the system; (ii) video is captured from the environment; (iii) video is processed to classify the environment and objects within the environment; (iv) per determined "distractions" as below mentioned are detected and classified as such; and/or (v) detected distractions are diminished through one of or a combination of: (a) direct enhancement of the image via additional projected light (typical HUD operation), (b) using projected light to 'white-wash' a image where dark regions of an object are enhanced with extra light to give a flat color, (c) polarizing lenses are used to darken (sections) of the image thereby obscuring the image, and (vi) one or more obscured visual distractions are replaced or overlaid with an alternative image or advertisement targeted at the user of the system.

A case study involving combined polarization and light transmission obfuscation will now be discussed. This case study deals with approaching headlights on a road restricting vision. An augmented reality display system according to the present disclosure isolates the headlights as a risk to the user's vision. In order to dim the oncoming lights, the polarization (blocking the light) within the lenses would be increased. Additionally, the projective objects could be used to augment the critical parts of the scene, such as: (i) the position of surrounding vehicles, (ii) road signals/lines and/or (iii) pedestrians. This style of application would be equally as applicable for aviation whether military or civilian.

Another case study involving combined polarization and light transmission obfuscation will now be discussed. This case study deals with transmission obfuscation. Consider a high security environment where personnel must obtain a security clearance, whether corporate or national, to work within the environment. Further consider lower security items within the same environment. If personnel need access where they do not have sufficient clearance for all devices within the environment, access may be granted if the device is configured to obscure the high security object via "white washing" (that is, increasing light transmission to bright regions thereby reducing visibility.

A case study involving combined polarization and light transmission obfuscation will now be discussed. This case study deals with selective removal of advertisements. In this example, an advertisement is detected either through sourcing data on advertisements from a database or through the use of a system and method to otherwise detect an advertisement (still or moving). The visual advertisement would then be selectively obscured from the field of vision through one or more of the aforementioned embodiments. Optionally the advertisement could be replaced by with one as determined by the operator of the augmented reality device.

Some embodiments of the present invention may include one, or more, of the following characteristics, features and/or advantages: (i) a system and method that detects known advertisements and augments reality through the aforementioned embodiments to eliminate those advertisements; (ii) a system and method that detects directed light distractions and eliminates and or reduces the intensity of those distractions through the aforementioned embodiments; (iii) a system and method that detects unknown sources of distraction and eliminates or reduces the intensity of those distractions through the aforementioned embodiments; (iv) use of user preference data and context awareness; (v) advertisements are replaced by other images or advertisements; and/or (vi) distraction detection and/or elimination capability.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Diminish: any visual display and/or video augmentation that tends to diminish some visual feature present in a base video display (or raw video display) that corresponds to a view of a portion of the real world; "diminishment" is different than conventional augmentation which adds data to a real world display, or emphasizes features present in a base display.

Driver distraction phenomena: any visual feature in a base display substantially corresponding to the perspective of a vehicle driver that would tend to distract the driver in the sense that the distraction detracts from the driver's ability to drive well.

Unauthorized content: any content that a user is not authorized to view; in various applications, unauthorized content may include: confidential subject matter, graphic subject matter, disturbing subject matter, offensive subject matter, subject matter which can trigger adverse health effects (for example, a flashing light that can trigger an epileptic episode), subject matter which is hidden for purposes of game play, etc.

What is claimed is:

1. A method comprising:
   donning, by a user, an image capturing device that optically tracks the user's field of view;

generating, by the image capturing device, a raw video data set corresponding to the user's field of view;

detecting, in the plurality of computer readable images, the presence and location of unauthorized material in the raw video data set corresponding to a real world object in the user's field of view;

responsive to the detection of the unauthorized material, generating a set of diminishment data to obscure the unauthorized material; and augmenting a display, which can be seen on and/or through augmented real world display hardware, based on the set of diminishment data to generate an augmented reality display where the unauthorized material is obscured by the augmentation by changing the way in which light reflected or projected by the unauthorized material reaches the user.

2. The method of claim 1 wherein the augmented real world display hardware includes goggles structured so that a user can see the real world, through the goggles.

3. The method of claim 1 wherein the real world display hardware includes blurring hardware.

4. The method of claim 1 wherein the visual distraction is an unauthorized subject matter type distraction includes confidential subject matter.

5. A computer program product comprising:
a machine readable storage device; and
computer code stored on the machine readable storage device, with the computer code including instructions for causing a processor(s) set to perform operations including the following:
donning, by a user, an image capturing device that optically tracks the user's field of view,
generating, by the image capturing device, a raw video data set corresponding to the user's field of view,
detecting, in the plurality of computer readable images, the presence and location of unauthorized material in the raw video data set corresponding to a real world object in the user's field of view,
responsive to the detection of the unauthorized material, generating a set of diminishment data to obscure the unauthorized material, and
augmenting a display, which can be seen on and/or through augmented real world display hardware, based on the set of diminishment data to generate an augmented reality display where the unauthorized material is obscured by the augmentation by changing the way in which light reflected or projected by the unauthorized material reaches the user.

6. The computer program product of claim 5 wherein the augmented real world display hardware includes goggles structured so that a user can see the real world through the goggles.

7. The computer program product of claim 5 wherein the real world display hardware includes blurring hardware.

8. The computer program product of claim 5 wherein the visual distraction is an unauthorized subject matter type distraction includes confidential subject matter.

9. A computer system comprising:
a processor(s) set;
a machine readable storage device; and
computer code stored on the machine readable storage device, with the computer code including instructions for causing the processor(s) set to perform operations including the following:
donning, by a user, an image capturing device that optically tracks the user's field of view,
generating, by the image capturing device, a raw video data set corresponding to the user's field of view,
detecting, in the plurality of computer readable images, the presence and location of unauthorized material in the raw video data set corresponding to a real world object in the user's field of view,
responsive to the detection of the unauthorized material, generating a set of diminishment data to obscure the unauthorized material, and
augmenting a display, which can be seen on and/or through augmented real world display hardware, based on the set of diminishment data to generate an augmented reality display where the unauthorized material is obscured by the augmentation by changing the way in which light reflected or projected by the unauthorized material reaches the user.

10. The computer system of claim 9 wherein the augmented real world display hardware includes goggles structured so that a user can see the real world through the goggles.

11. The computer system of claim 9 wherein the real world display hardware includes blurring hardware.

12. The computer system of claim 9 wherein the visual distraction is an unauthorized subject matter type distraction includes confidential subject matter.

* * * * *